(12) United States Patent
Cheng et al.

(10) Patent No.: US 9,996,183 B2
(45) Date of Patent: Jun. 12, 2018

(54) TOUCH-SENSITIVE DEVICE AND METHOD FOR DRIVING THE SAME

(71) Applicant: BOE TECHNOLOGY GROUP CO., LTD., Beijing (CN)

(72) Inventors: Hongfei Cheng, Beijing (CN); Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 14/423,962

(22) PCT Filed: May 27, 2014

(86) PCT No.: PCT/CN2014/078521
§ 371 (c)(1),
(2) Date: Feb. 25, 2015

(87) PCT Pub. No.: WO2015/085721
PCT Pub. Date: Jun. 18, 2015

(65) Prior Publication Data
US 2016/0034091 A1 Feb. 4, 2016

(30) Foreign Application Priority Data
Dec. 13, 2013 (CN) .......................... 2013 1 0685056

(51) Int. Cl.
*G06F 3/041* (2006.01)
*G09G 3/36* (2006.01)
(Continued)

(52) U.S. Cl.
CPC ............ *G06F 3/0416* (2013.01); *G06F 3/044* (2013.01); *G06F 3/047* (2013.01); *G06F 3/0412* (2013.01);
(Continued)

(58) Field of Classification Search
CPC ...... G06F 3/0416; G06F 3/0412; G06F 3/044; G06F 3/047; G06F 2203/04112; G09G 5/003; G09G 3/36
See application file for complete search history.

(56) References Cited

U.S. PATENT DOCUMENTS 5,510,813 A * 4/1996 Makinwa ................. G06F 3/041
341/33
8,766,950 B1 * 7/2014 Morein .................... G06F 3/044
345/173
(Continued)

FOREIGN PATENT DOCUMENTS

CN 2891038 Y 4/2007
CN 101937143 A 1/2011
(Continued)

OTHER PUBLICATIONS

European Search Report dated Jun. 16, 2016, for corresponding European Patent Application No. 14861136.1.
(Continued)

*Primary Examiner* — Benyam Ketema
(74) *Attorney, Agent, or Firm* — Kinney & Lange, P.A.

(57) ABSTRACT

A touch-sensitive device comprises: a touch-sensing carrier panel; a driving signal line and a inductive signal line; a touch-sensitive circuit connected with the driving signal line and the inductive signal line; an array of first electrodes and an array of second electrodes located on the touch-sensing carrier panel; a first switch having an end connected to the array of the first electrodes and the other end connected to the corresponding driving signal line and the corresponding inductive signal line; and a second switch having an end connected to the array of the second electrodes and the other end connected to the corresponding driving signal line and the corresponding inductive signal line, wherein each of the first switch and the second switch is adapted to switch (Continued)

between a respective driving signal line and a respective inductive signal line such that the array of first electrodes is connected with one of the driving signal line and the inductive signal line and the array of second electrodes is connected with the other one of the driving signal line and the inductive signal line. The present disclosure also provides a method for driving the above touch-sensitive device. The present invention may perform the signal conversion by switches such that the first electrodes and the second electrodes are switched between the connections to the inductive signal lines and the connections to the driving signal lines by performing signal switching by switches, so as to achieve the double side touch sensing.

12 Claims, 6 Drawing Sheets

(51) Int. Cl.
    *G09G 5/00*       (2006.01)
    *G06F 3/044*     (2006.01)
    *G06F 3/047*     (2006.01)

(52) U.S. Cl.
    CPC .............. *G09G 3/36* (2013.01); *G09G 5/003* (2013.01); *G06F 2203/04104* (2013.01); *G06F 2203/04112* (2013.01); *G09G 2300/04* (2013.01)

(56) References Cited

U.S. PATENT DOCUMENTS

| | | | | |
|---|---|---|---|---|
| 8,810,524 B1* | 8/2014 | Rosenberg | ............ | G06F 1/1643 345/1.1 |
| 9,395,833 B2* | 7/2016 | Lee | ...................... | G06F 3/04883 |
| 2003/0234769 A1* | 12/2003 | Cross | ................... | G06F 3/0412 345/173 |
| 2007/0159561 A1* | 7/2007 | Chien | ..................... | G06F 3/044 349/12 |
| 2010/0164904 A1* | 7/2010 | Kim | ........................ | G06F 3/038 345/174 |
| 2010/0188353 A1* | 7/2010 | Yoon | ................... | G06F 3/04883 345/173 |
| 2011/0109568 A1 | 5/2011 | Wu et al. | | |
| 2011/0242050 A1* | 10/2011 | Byun | ...................... | G06F 3/044 345/174 |
| 2012/0086879 A1* | 4/2012 | Yu | .......................... | G06F 3/0412 349/33 |
| 2012/0319963 A1* | 12/2012 | Lee | .......................... | G06F 3/044 345/173 |
| 2013/0141363 A1* | 6/2013 | Hung | .................... | G06F 3/0488 345/173 |
| 2013/0155007 A1 | 6/2013 | Huang et al. | | |
| 2013/0321296 A1* | 12/2013 | Lee | .......................... | G06F 3/041 345/173 |
| 2014/0045553 A1* | 2/2014 | Shimada | .................. | G06F 3/041 455/566 |
| 2014/0071360 A1* | 3/2014 | Chang | ................... | G06F 3/0412 349/12 |
| 2014/0160067 A1* | 6/2014 | Kim | ...................... | G06F 3/0416 345/174 |
| 2015/0062062 A1* | 3/2015 | Han | ...................... | G06F 3/0412 345/174 |
| 2015/0160495 A1* | 6/2015 | Yang | .................. | G02B 27/2264 349/12 |

FOREIGN PATENT DOCUMENTS

| | | |
|---|---|---|
| CN | 202230459 U | 5/2012 |
| CN | 102945110 A | 2/2013 |
| CN | 103677476 A | 3/2014 |
| KR | 20-2010-0003321 U | 9/2010 |

OTHER PUBLICATIONS

International Search Report and Written Opinion in Chinese for PCT/CN2014/078521 dated Aug. 18, 2014.

English translation of Box V of the Written Opinion dated Aug. 18, 2014, for corresponding PCT Application No. PCT/CN2014/078521.

First Chinese Office Action and English translation dated Dec. 22, 2015, for corresponding Chinese Application No. 201310685056.0.

* cited by examiner

TOUCH-SENSITIVE DEVICE AND METHOD FOR DRIVING THE SAME

BACKGROUND OF THE DISCLOSURE

Field of the Disclosure

The present disclosure relates to the technical field of touch-sensing, more particularly, relates to a touch-sensitive device and a method for driving the touch-sensitive device.

Description of the Related Art

The capacitive touch-sensing technology has imparted great convenience to the people's production and lives. According to this technology, at first, a touch-sensing detection region is divided into a plurality of grid points formed by rows of lines and columns of lines crossing with each other, and then variations of capacitances of the grid points are detected to obtain the position information of the touch points.

Current touch-sensitive device is a single-side touch-sensitive device. FIGS. 1a and 1b show schematic views of a known single-side touch-sensing structure. The touch-sensitive device includes: a touch-sensing carrier panel 110 and a driving electrode 120, an insulating layer 140 and an inductive electrode 130 formed in sequence on one side of the touch-sensing carrier panel 110. As shown in FIG. 1b, a plurality of driving electrodes 120 and inductive electrodes 130 form an interlaced array. Each row of the inductive electrodes 130 are connected with a touch-sensitive circuit by an inductive signal line 160 and each column of the driving electrodes 120 are connected with the touch-sensitive circuit by a driving signal line 150.

There is a mutual inductive capacitance between the driving electrode 120 and the inductive electrode 130. When a driving signal is applied to the driving electrode 120, an inductive signal is obtained correspondingly on the inductive electrode 130 by coupling of the mutual inductive capacitance. When a touch occurs, a value of the mutual inductive capacitance will be varied due to the effects of the electrical field of a human body. And measuring the inductive signal at the inductive electrode 130 may determine whether the touch occurs and can determine the position of the touch pointon the touch-sensing carrier panel 110.

The above touch-sensitive device can only perform a single-side touch sensing, and cannot perform a double-side touch sensing.

SUMMARY OF THE DISCLOSURE

Technical Problem to be Solved

The technical problem of the present disclosure to be solved is to provide a touch-sensitive device that can realize double-side touch sensing.

Technical Solutions

In order to achieve the above object, the present disclosure provides a touch-sensitive device, comprising: a touch-sensing carrier panel; a driving signal line and a inductive signal line; a touch-sensitive circuit connected with the driving signal line and the inductive signal line; an array of first electrodes and an array of second electrodes located on the touch-sensing carrier panel; a first switch having an end connected to the array of the first electrodes and the other end connected to the corresponding driving signal line and the corresponding inductive signal line; and a second switch having an end connected to the array of the second electrodes and the other end connected to the corresponding driving signal line and the corresponding inductive signal line, wherein each of the first switch and the second switch is adapted to switch between a respective driving signal line and a respective inductive signal line such that the array of first electrodes is connected with one of the driving signal line and the inductive signal line and the array of second electrodes is connected with the other one of the driving signal line and the inductive signal line.

In an embodiment of the present disclosure, the array of the first electrodes and the array of the second electrodes are located on two opposite sides of the touch-sensing carrier panel, respectively.

In an embodiment of the present disclosure, the array of the first electrodes and the array of the second electrodes are both located on the same side of the touch-sensing carrier panel and an insulating layer is arranged between the array of the first electrodes and the array of the second electrodes.

In an embodiment of the present disclosure, each row of the first electrodes are connected to one first switch and each column of the second electrodes are connected to one second switch; or each column of the first electrodes are connected to one first switch and each row of the second electrodes are connected to one second switch.

In an embodiment of the present disclosure, the touch-sensing carrier panel is a display panel.

In an embodiment of the present disclosure, the display panel comprises a first substrate and a second substrate opposed to the first substrate, the array of first electrodes being located on the first substrate and the array of second electrodes being located on the second substrate.

In an embodiment of the present disclosure, the array of the first electrodes is located on the side of the first substrate away from the second substrate and the array of the second electrodes is located on the side of the second substrate away from the first substrate.

In an embodiment of the present disclosure, the display panel comprises the first substrate and the second substrate opposed to the first substrate; and wherein the array of the first electrodes and the array of the second electrodes are both located on the first substrate, or the array of the first electrodes and the array of the second electrodes are both located on the second substrate.

In an embodiment of the present disclosure, a region surrounded by two adjacent rows of the first electrodes and two adjacent columns of the second electrodes corresponds to N pixel units of the display panel; or a region surrounded by two adjacent columns of the first electrodes and two adjacent rows of the second electrodes corresponds to N pixel units of the display panel, and wherein N is a natural number.

In an embodiment of the present disclosure, N is in a range of 3~15.

The present disclosure provides a method for driving the touch-sensitive device as described in any one of the above embodiments, the method comprises the steps of:

defining a predetermined time period t as one touch sensing period in which the array of the first electrodes is applied with a driving signal and an inductive signal from the array of the second electrodes is detected for a predetermined time period t1 and then the array of the second electrodes is applied with the driving signal and the inductive signal from the array of the first electrodes is detected for a predetermined time period t2, cycling the touch sensing period to realize a double-side touch sensing, wherein t1+t2=t.

In an embodiment of the present disclosure, t1=t2.

In an embodiment of the present disclosure, when the touch-sensing carrier panel is a display panel and a time period for displaying a frame of picture is T, a preceding part of the time period T is a display time slice T1 and a following part of the time period T is a touch sensing time slice T2, and wherein T1+T2=T, T1>T2, T2=s×t, and s≥1.

The present disclosure also provides a method for driving the touch-sensitive device as described in any one of the above embodiments, the method comprises the steps of:

manipulating the first switch to connect the array of the first electrodes to the driving signal line and manipulating the second switch to connect the array of the second electrodes to the inductive signal line; and after a predetermined period, manipulating the first switch to connect the array of the first electrodes to the inductive signal line and manipulating the second switch to connect the array of the second electrodes to the driving signal line.

Advantages

In the touch-sensitive device and the method for driving the same provided by the present disclosure, the first electrodes and the second electrodes are switched between the connections to the inductive signal lines and the connections to the driving signal lines by performing signal switching by switches, so as to achieve the double side touch sensing.

DETAILED DESCRIPTION OF EMBODIMENTS OF THE DISCLOSURE

Exemplary embodiments of the present disclosure will be described hereinafter in detail with reference to the attached drawings. The following embodiments are used to explain the present disclosure, but are not intended to limit the scope of the present disclosure.

The touch-sensitive device according to an embodiment of the present disclosure includes: a touch-sensing carrier panel, a touch-sensitive circuit, a driving signal line, a inductive signal line and a array of the first electrodes and an array of the second electrodes located on the touch-sensing carrier panel, the touch-sensitive circuit being connected with the driving signal line and the inductive signal line. In order to achieve double side touch sensing, the touch-sensitive device further includes a first switch having an end connected to the array of the first electrodes and the other end connected to the corresponding driving signal line and the corresponding inductive signal line; and a second switch having an end connected to the array of the second electrodes and the other end connected to the corresponding driving signal line and the corresponding inductive signal line. The first switch and the second switch are adapted to switch between the respective first switch and the respective second switch such that the array of the first electrodes is connected with one of the driving signal line and the inductive signal line and the array of the second electrodes is connected with the other of the driving signal line and the inductive signal line. That is, when the array of the first electrodes is connected with the inductive signal lines and the array of the second electrodes is connected with the driving signal lines, the first electrodes in the array of the first electrodes are inductive electrodes and the second electrodes in the array of the second electrodes are driving electrodes, the outer surface of the touch-sensitive device on the side with the array of the first electrodes and away from the array of the second electrodes being the touch-sensitive face. When the array of the second electrodes is connected with the inductive signal lines and the array of the first electrodes is connected with the driving signal lines, the second electrodes in the array of the second electrodes are inductive electrodes and the first electrodes in the array of the first electrodes are driving electrodes, the outer surface of the touch-sensitive device on the side with the array of the second electrodes and away from the array of the first electrodes being the touch-sensitive face. Thus, the double side touch sensing may be achieved.

Figure 1A:
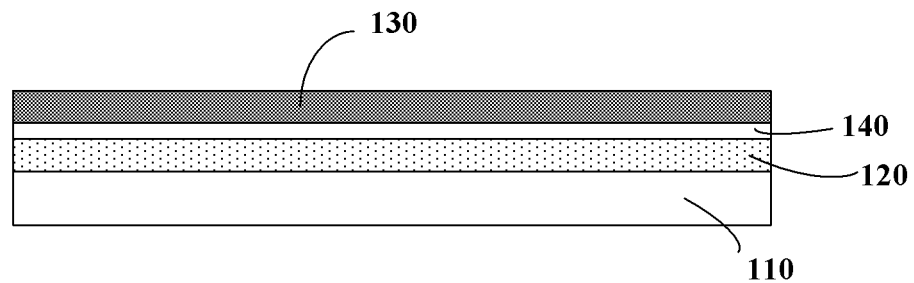
FIG. 1a is a schematic cross-sectional view of a touch-sensitive device known by the inventors.
Figure 1B:
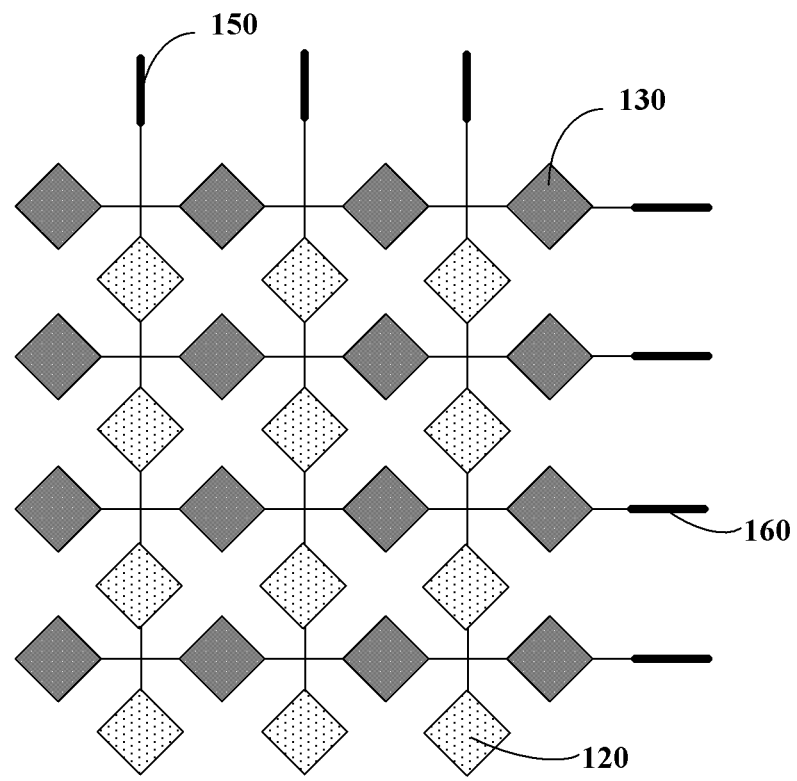
FIG. 1b is a schematic plan view of the touch-sensitive device known by the inventors.
Figure 2A:
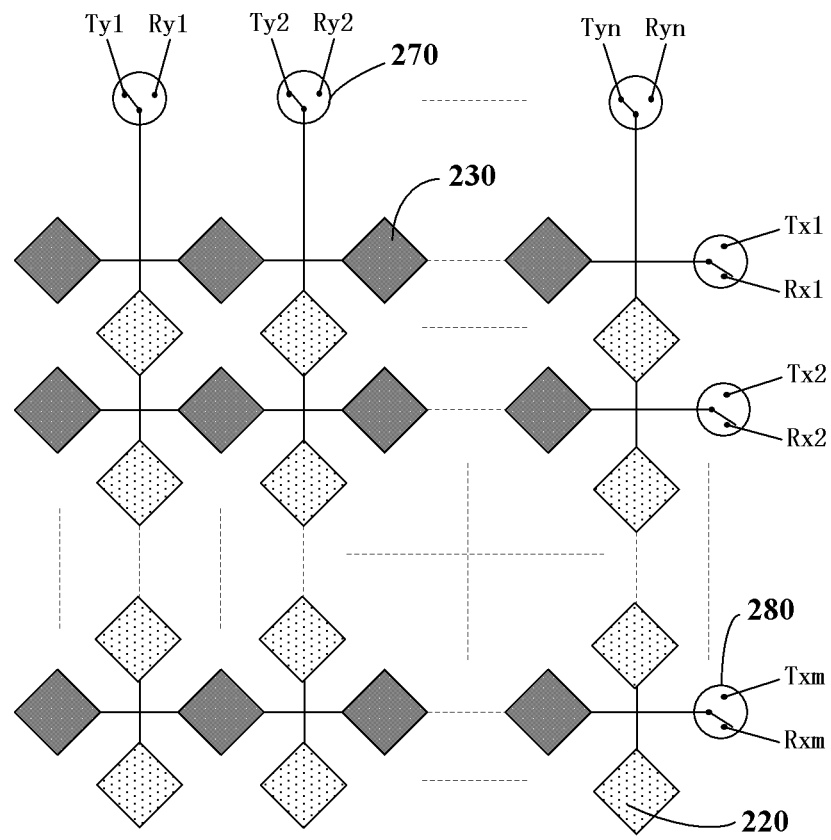
FIG. 2a is a schematic plan view of the touch-sensitive device according to an embodiment of the present disclosure.
Figure 2B:
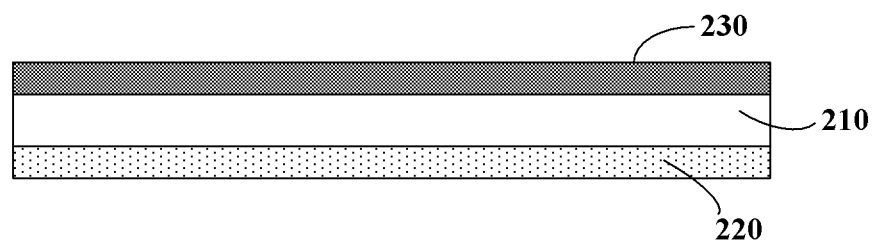
FIG. 2b is a schematic cross-sectional view of the touch-sensitive device according to an embodiment of the present disclosure.

As illustrated in FIGS. 2a and 2b, the first electrodes 220 are formed on the touch-sensing carrier panel 210 in a form of an array, and so do the second electrodes 230. Each of the first electrodes 220 and each of the second electrodes 230 are in the shape of rhombus. Switches and touch-sensitive circuits may be on non-touch-sensitive regions of the touch-sensing carrier panel 210 or other carriers. This embodiment is not limited thereto. The first electrodes 220 and the second electrodes 230 may be located on the same side of the touch-sensing carrier panel 210 or on two opposite sides of the touch-sensing carrier panel 210 respectively. When the first electrodes 220 and the second electrodes 230 are located on the same side of the touch-sensing carrier panel 210, an insulating layer is arranged between the array of the first electrodes 220 and the array of the second electrodes 230. In order to improve sensitivity of touch sensing, preferably, the first electrodes 220 and the second electrodes 230 are located on two opposite sides of the touch-sensing carrier panel 210, respectively. Such an arrangement can eliminate the need for the insulating layer between the first electrodes 220 and the second electrodes 230, in contrast to the arrangement in which the first electrodes 220 and the second electrodes 230 are located on the same side, thus, materials can be saved and a thickness of the touch-sensitive device can be reduced.

In the above embodiment, specifically, the switches may include first switches 270 and second switches 280. In FIG. 2a, each row of the first electrodes 220 are connected to one first switch 270 and each column of the second electrodes 230 are connected to one second switch 280, respectively. Under the control of the touch-sensitive circuit, the first switch 270 may switch the first electrodes 220 between a connection to the inductive signal line Ryi (where i=1, 2, . . . , n, and Ryi represents the i-th inductive signal line configured to output an inductive signal to the touch-sensitive circuit) and a connection to the driving signal line Tyi (where i=1, 2, . . . , n, and Tyi represents the i-th driving signal line configured to cause the touch-sensitive circuit to input a driving signal into the driving electrode). Correspondingly, under the control of the touch-sensitive circuit, the second switch 280 may switch the second electrodes 230 between a connection to the driving signal line Txj (where j=1, 2, . . . , m, and Txj represents the j-th driving signal line configured to cause the touch-sensitive circuit to input a driving signal into the driving electrode) and a connection to the inductive signal line Rxj (where j=1, 2, . . . , m, and Rxj represents the j-th inductive signal line configured to output an inductive signal to the touch-sensitive circuit). Alternatively, the first electrodes 220 in rows may be connected to the first switch 270 and the second electrodes 230 in columns may be connected to the second switch 280.

Figure 2C:
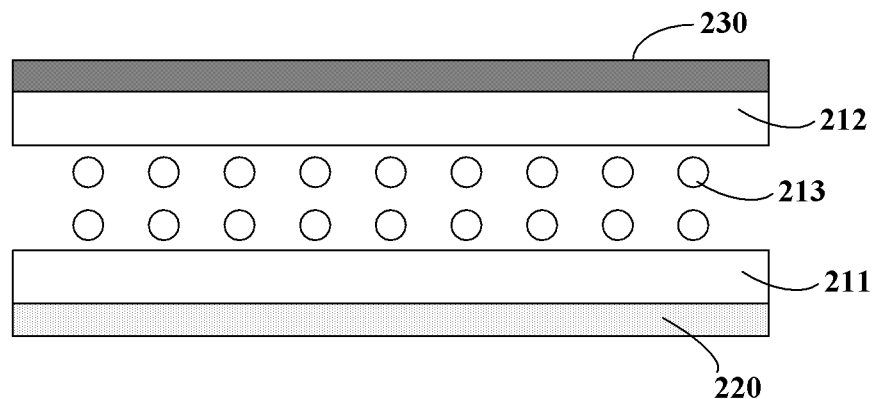
FIG. 2c is a schematic view showing a structure of a touch-sensitive display device according to an embodiment of the present disclosure.

The touch-sensing carrier panel 210 may be a display panel. As illustrated in FIG. 2c, the embodiments will be explained below with reference to a liquid crystal display panel. The touch-sensing carrier panel 210 includes a first substrate 211, a second substrate 212, and liquid crystal 213 located between them. The first electrodes 220 and the second electrodes 230 may both be located on the first substrate 211, or may both be located on the second substrate 212, or may be located on the first substrate 211 and the second substrate 212 respectively. Preferably, the first electrodes 220 and the second electrodes 230 are both located on the first substrate 211 and the second substrate 212 respectively.

Figure 6:
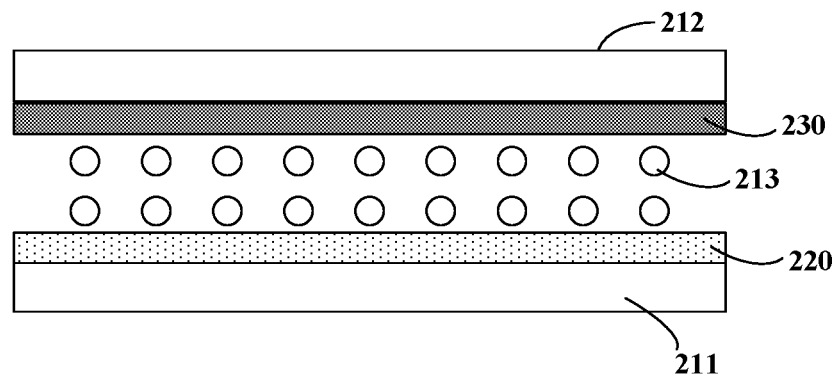
FIG. 6 is a schematic view showing a structure of a touch-sensitive display device according to another embodiment of the present disclosure.
Figure 7:
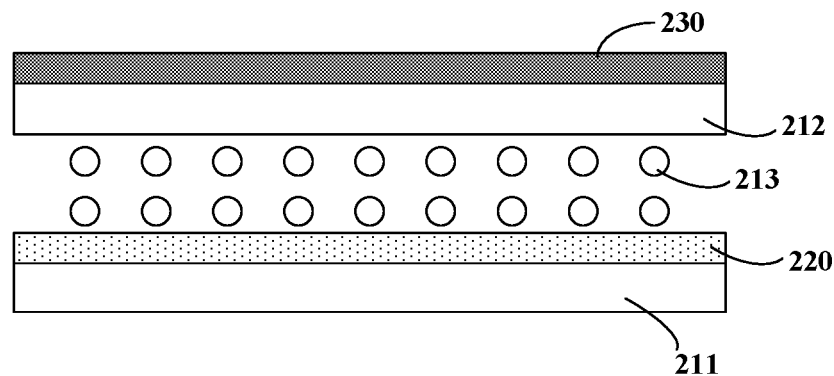
FIG. 7 is a schematic view showing a structure of a touch-sensitive display device according to another embodiment of the present disclosure.
Figure 8:
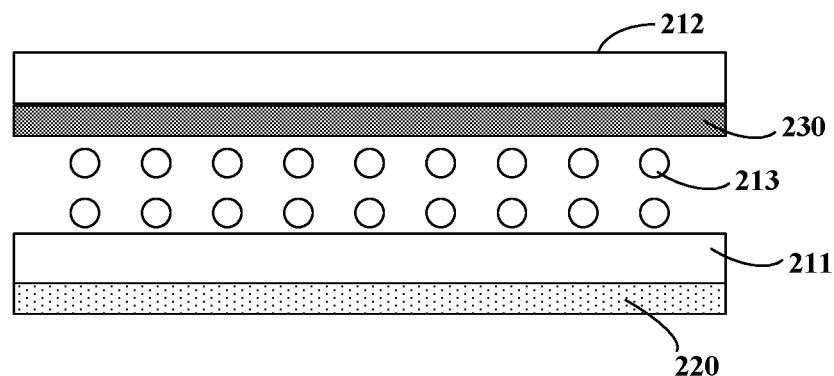
FIG. 8 is a schematic view showing a structure of a touch-sensitive display device according to another embodiment of the present disclosure.

In order to improve the sensitivity of touch sensing, the array of the first electrodes 220 is located on the side of the first substrate 211 away from the second substrate 212 and the array of the second electrodes 230 is located on the side of the second substrate 212 away from the first substrate 211. That is, the first electrodes 220 and the second electrodes 230 are located on two opposite outer surfaces of the display panel respectively. Typically, surfaces of the first electrodes 220 and the second electrodes 230 are further provided with protective layers respectively. Certainly, the first electrodes 220 and the second electrodes 230 may be arranged in an embedded manner, i.e., the first electrodes 220 and the second electrodes 230 are located in a stack on the sides of the first substrate 211 and the second substrate 212 facing the liquid crystal 213 respectively (see FIG. 6). Alternatively, one of the first electrodes 220 and the second electrodes 230 may be arranged in an embedded manner while the other one of them are located on the outer surface of the display panel (see FIGS. 7 and 8).

Figure 3:
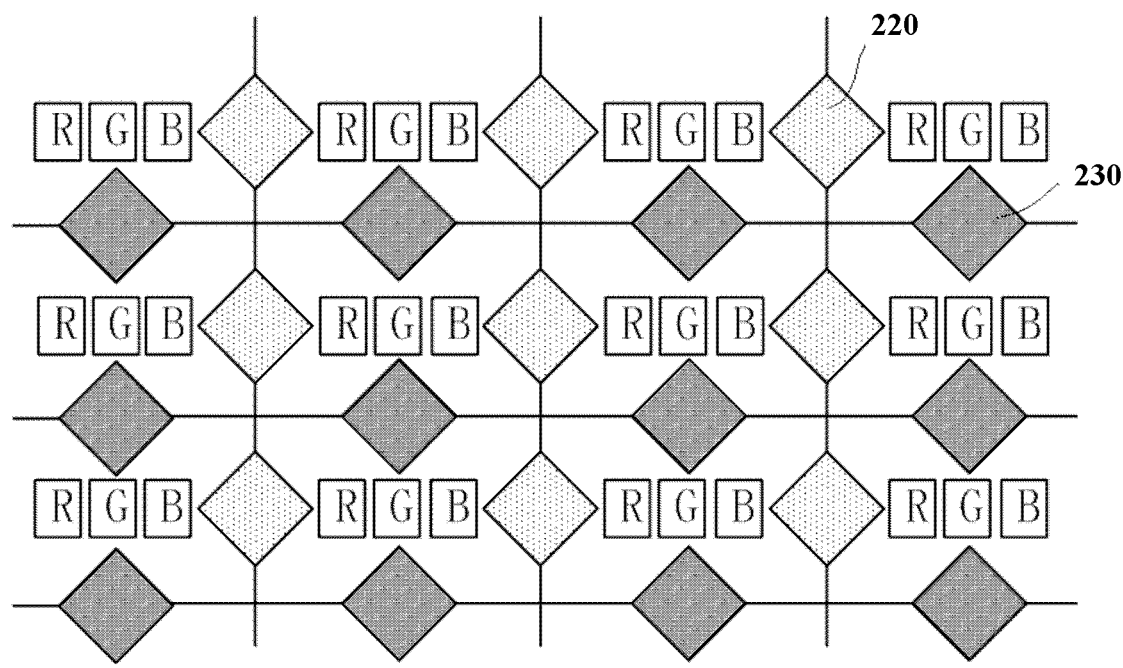
FIG. 3 is a schematic view showing a layout of touch-sensitive electrodes and pixel units in a touch-sensitive display device according to an embodiment of the present disclosure.
Figure 4:
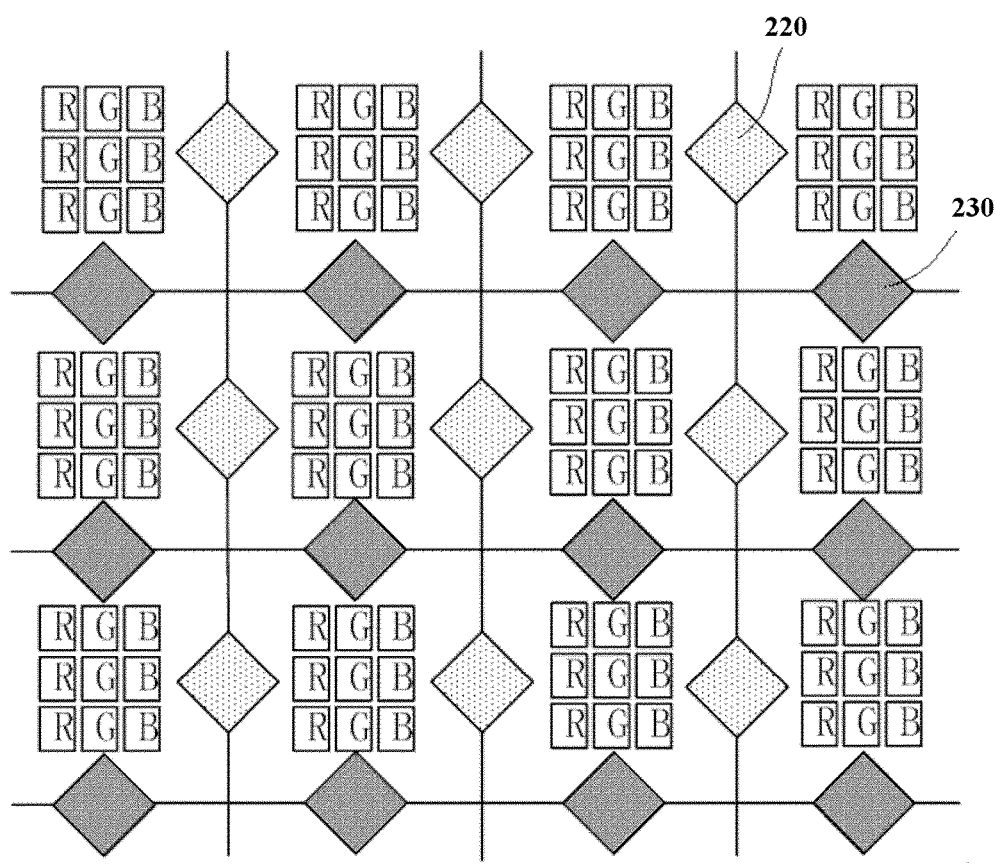
FIG. 4 is a schematic view showing another layout of touch-sensitive electrodes and pixel units in a touch-sensitive display device according to an embodiment of the present disclosure.

In order to achieve a certain accuracy of touch sensing, as shown in FIGS. 3 and 4, a region surrounded by two adjacent rows of the first electrodes 220 and two adjacent columns of the second electrodes 230 corresponds to N pixel units of the display panel, where N is a natural number. Alternatively, the first electrodes may be connected in rows and the second electrodes may be connected in columns. N is a value in the range of 3~15. The smaller N is, the more definition of touch sensing becomes and thus the more difficult the producing process is (i.e., the densities of the first electrodes and the second electrodes become higher). N may be 5, and with such a value, the accuracy of touch sensing may be ensured and the difficulty of producing process may be reduced.

Figure 5:
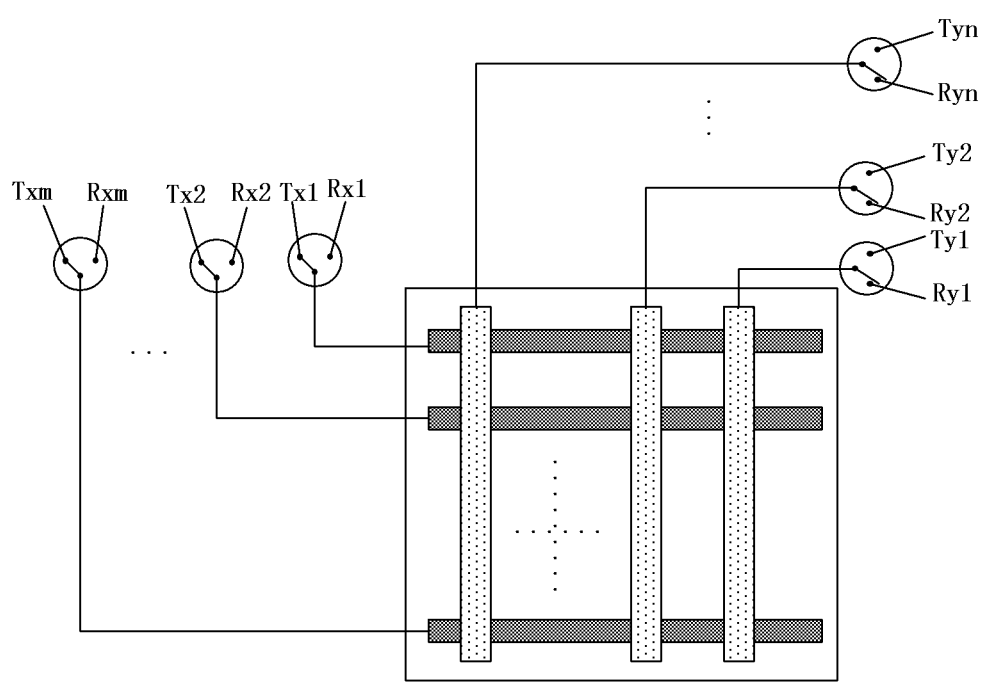
FIG. 5 is a schematic plan view of another touch-sensitive display device according to an embodiment of the present disclosure.

As illustrated in FIG. 5, each of the first electrodes and the second electrodes may be in the shape of a strip, or may be arrayed in other shapes.

An embodiment of the present disclosure also provides a method for driving the touch-sensitive device as described above. In the method, a predetermined time t is defined as one touch-sensing period in which the array of the first electrodes is applied with a driving signal and an inductive signal from the array of the second electrodes is detected for a predetermined time period t1 and then the array of the second electrodes is applied with a driving signal and an inductive signal from the array of the first electrodes is detected for a predetermined time period t2. The above touch-sensitive period is cycled to realize a double-side touch sensing, wherein t1+t2=t. The switching of the driving signal and the inductive signal between the array of the first electrodes and the array of the second electrodes may be achieved specifically by touch-sensitive circuit and switches.

Further, in order that two sides have the same probability of sensing a touch, t1 may be equal to t2 (t1=t2).

If the touch-sensing carrier panel is a display panel, as shown in FIG. 2, an electrical field between the first electrodes and the second electrodes will affect the display effects (for example, affect the deflection of liquid crystal molecules in a liquid crystal panel) since the first electrodes 220 and the second electrodes 230 are located on the first substrate 211 and the second substrate 212 respectively. In order to improve the display effects, a display period and a touch sensing period may be defined in different time periods that are not overlapped with each other. In particular, the time period for displaying a frame of picture is T. A preceding part of the time period T is a display time slice T1, and a following part of the time period T is a touch sensing time slice T2, wherein T1+T2=T, T2=s×t, and s≥1. Preferably, s is an integer.

Because the display time slices spaced apart by the touch sensing time slice are not continuous, in order to prevent a flicker phenomenon from affecting human's eyes, the following relationship should be met: T1>T2, and preferably, T1/T2≥2. The bigger the value of T1/T2 is, the weaker the flicker phenomenon becomes. For example, in the event that a time period of displaying one frame for the display panel is 16.7 ms, 4 ms of the time slice is selected and used as the touch sensing time slice and the remaining 12.7 ms is used as the display time slice. Alternatively, lengths of the two time slices may be adjusted suitably on the basis of process capacity of IC chip, which is not specified herein.

In accordance with an embodiment of the present disclosure, it provides a method for driving the touch-sensitive device as described above. The method comprises the steps of: manipulating the first switch 270 to connect the array of the first electrodes to the driving signal line and manipulating the second switch 280 to connect the array of the second electrodes to the inductive signal line; and after a predetermined period, manipulating the first switch 270 to connect the array of the first electrodes to the inductive signal line and manipulating the second switch 280 to connect the array of the second electrodes to the driving signal line correspondingly.

In the embodiments of the present disclosure, when it is determined that a touch occurs on a side of the panel, the method for sensing and locating the touch is substantially identical to that in the prior art, and specific description for the method is thereby omitted.

The above embodiments are only used to explain the present disclosure, instead of limiting the present disclosure. It would be appreciated by those skilled in the art that various changes or modifications may be made in these embodiments without departing from the spirit and scope of the present disclosure. Thus, all of equivalents will also fall within the scope of the present disclosure. The scope of the present disclosure is defined in the claims.

What is claimed is:

1. A touch-sensitive device comprising:
   a touch-sensing carrier panel comprising a first substrate and a second substrate opposed to the first substrate;
   a driving signal line and an inductive signal line;
   a touch-sensitive circuit connected with the driving signal line and the inductive signal line;
   an array of first electrodes and an array of second electrodes located on the touch-sensing carrier panel;
   a first switch having a first end connected to the array of the first electrodes and a second end connected to the driving signal line and the inductive signal line;
   a second switch having a first end connected to the array of the second electrodes and a second end connected to the driving signal line and the inductive signal line;
   wherein each of the first switch and the second switch is adapted to switch between the driving signal line and the inductive signal line such that the array of first electrodes is connected with one of the driving signal line and the inductive signal line and the array of second electrodes is connected with the other one of the driving signal line and the inductive signal line, and
   wherein at least one array of the array of the first electrodes and the array of the second electrodes is located between the first substrate and the second substrate.

2. The touch-sensitive device according to claim 1, comprising a plurality of the first switch and a plurality of the second switch, wherein
   each row of the array of the first electrodes are connected to one first switch and each column of the array of the second electrodes are connected to one second switch; or
   each column of the array of the first electrodes are connected to one first switch and each row of the array of the second electrodes are connected to one second switch.

3. The touch-sensitive device according to claim 1, wherein
   a region surrounded by two adjacent rows of the array of the first electrodes and two adjacent columns of the array of the second electrodes corresponds to N pixel units of the display panel; or
   a region surrounded by two adjacent columns of the array of the first electrodes and two adjacent rows of the array of the second electrodes corresponds to N pixel units of the display panel, and
   wherein N is a natural number.

4. The touch-sensitive device according to claim 3, wherein N is in a range of 3~15.

5. A method for driving the touch-sensitive device of claim 1,
   the method comprising the steps of:
   defining a predetermined time period t as one touch sensing period in which the array of the first electrodes is applied with a driving signal and an inductive signal from the array of the second electrodes is detected for a predetermined time period t1 and then the array of the second electrodes is applied with the driving signal and the inductive signal from the array of the first electrodes is detected for a predetermined time period t2, and
   cycling the touch sensing period to realize a double-side touch sensing, wherein t1+t2=t.

6. The method according to claim 5, wherein t1=t2.

7. The method according to claim 5, wherein when the touch-sensing carrier panel is a display panel and a time period for displaying a frame of a picture is T, a preceding part of the time period T is a display time slice T1 and a following part of the time period T is a touch sensing time slice T2, and wherein T1+T2=T, T1>T2, T2=s×t, and s is a number that is greater than or equal to 1.

8. A method for driving the touch-sensitive device according to claim 1, the method comprising the steps of:
   manipulating the first switch to connect the array of the first electrodes to the driving signal line and manipulating the second switch to connect the array of the second electrodes to the inductive signal line; and
   after a predetermined period, manipulating the first switch to connect the array of the first electrodes to the inductive signal line and manipulating the second switch to connect the array of the second electrodes to the driving signal line.

9. The touch-sensitive device according to claim 1, wherein the touch-sensing carrier panel is a display panel.

10. The touch-sensitive device according to claim 9, wherein the display panel comprises:
    the first substrate and the second substrate opposed to the first substrate; and
    liquid crystal between the first substrate and the second substrate,
    wherein the array of the first electrodes and the array of the second electrodes are located in stacks on sides of the first substrate and the second substrate facing the liquid crystal respectively.

11. The touch-sensitive device according to claim 9, wherein the display panel comprises:
    the first substrate and the second substrate opposed to the first substrate; and
    liquid crystal between the first substrate and the second substrate,
    wherein the array of the first electrodes is located in a stack on a side of the first substrate facing the liquid crystal and the array of the second electrodes is located on a side of the second substrate away from the first substrate.

12. The touch-sensitive device according to claim 9, wherein the display panel comprises:
    the first substrate and the second substrate opposed to the first substrate; and
    liquid crystal between the first substrate and the second substrate,
    wherein the array of the first electrodes is located on a side of the first substrate away from the second substrate and the array of the second electrodes is located in a stack on a side of the second substrate facing the liquid crystal.

\* \* \* \* \*